Oct. 2, 1951 — W. C. GREGORY — 2,569,714
STRAIN GAUGE
Filed March 12, 1945
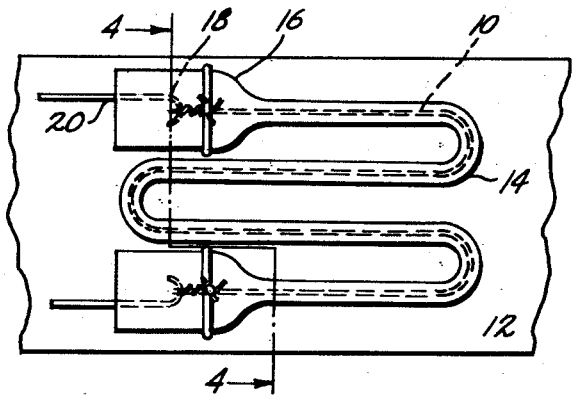
Fig. 1
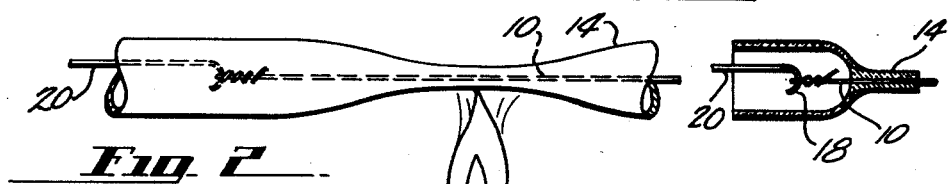
Fig. 2          Fig. 3
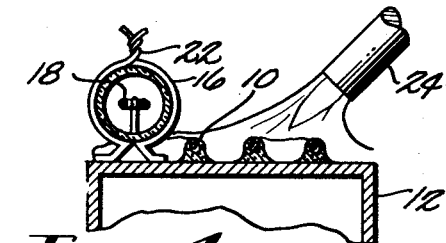    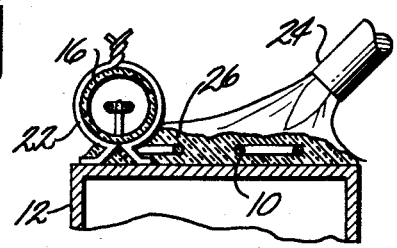
Fig. 4          Fig. 5
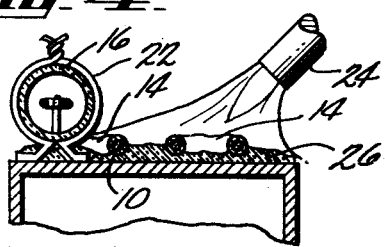    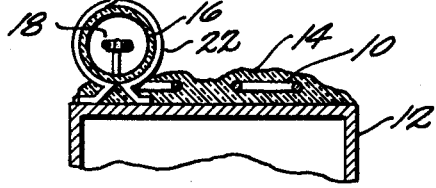
Fig. 7          Fig. 6
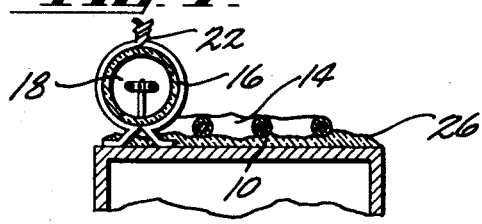
Fig. 8
INVENTOR.
WILLIAM C. GREGORY
BY
Edwin Coates
ATTORNEY Patented Oct. 2, 1951

2,569,714

UNITED STATES PATENT OFFICE 2,569,714

STRAIN GAUGE

William C. Gregory, Los Angeles, Calif.

Application March 12, 1945, Serial No. 582,288

6 Claims. (Cl. 201—63)

My invention relates to instruments for the measurement of strain effects in parts at temperatures so high that strain gauges of usual construction cannot be used for the reason that they would be destroyed by the heat of the part.

It may be obviously desirable to carefully determine the stresses in highly heated parts such as engine cylinder heads and exhaust systems but the direct determination of such stresses by strain gauges, which provide a convenient and accurate means for such investigation, has hitherto been impossible.

Strain gauges, as usually constructed for measuring stresses in parts by direct application thereto, and of the type to which this invention relates, comprise resistance elements generally formed by a length of fine resistance wire preferably formed into a grid and secured to a backing of thin material such as rice paper. As this type of gauge is mounted with a suitable adhesive directly upon the part under test it cannot be used on parts which become heated to high temperatures.

The general object of the invention is to provide a construction of strain gauge of the type utilizing a fine resistance wire directly mounted upon a part to be tested which may be employed to measure the stresses in bodies even at red heat.

An object of the invention is to provide a simple and satisfactory strain gauge for use at elevated temperatures, which may be immovably secured to the part to be observed, by material which is substantially unaffected by the relatively high range of temperature for which the gauge is intended.

A further object of the invention is to provide a strain gauge for use at elevated temperatures, having the resistance wire from which the gauge is made immovably secured to the member to be tested by material serving both to secure the wire to the member and to electrically insulate it therefrom.

Another object of the invention is to provide means for protecting the junction of leads connecting the strain gauge to temperature recording instruments from the effects of the elevated temperatures to which the strain gauge is exposed.

Another object of the invention is to provide a novel method of securing high temperature strain gauges to metal surfaces which in use are heated to a relatively high temperature.

Still other objects and features of the invention will hereinafter appear in the following description taken in conjunction with the accompanying drawings which show forms of strain gauges constructed according to the invention by way of illustration, but this illustrative showing is not in any way limitative of the invention, the scope of which is defined in the appended claims.

In the drawing,

Figure 1 is a plan view of a piece of material having a strain gauge formed according to one form of the invention applied hereto, the connection of the leads to the gauge being shown as protected by glass tubing.

Figure 2 shows the first step in making the strain gauge shown in Figure 1.

Figure 3 is a fragmentary view of a modified form of the gauge shown in Figure 1.

Figure 4 is a cross section on the line 4—4 of Figure 1.

Figure 5 shows a first step in an alternative method of making the strain gauge.

Figure 6 is a view similar to Figure 5, but showing a later step in making the strain gauge of the form shown in Figure 5.

Figure 7 shows a first step in another method of forming the strain gauge.

Figure 8 is a view similar to Figure 5 showing a later step in the method shown in Figure 7.

The material used to mount the strain gauge on the test piece is of the type generally designated by the term "ceramic" which term covers in its broadest sense materials produced from earth, specifically clays, by the action of heat, and covers vitreous products such as glass and enamels as well as pottery and porcelain.

The material used to mount the strain gauge in practicing the invention is chosen with respect to the similarity of its coefficient of expansion with that of the metal to which the gauge is to be applied.

The coefficient of expansion of glass may range from about $8 \times 10^{-7}$ per cm. per degree C. per second to $140 \times 10^{-7}$ per cm. per degree C. per second. This wide range of coefficients of expansion enables a suitable composition of glass to be selected to form strain gauges according to the invention for use with parts made of various metals and I, therefore, have described the use of glass in the embodiment of the invention herein described.

As an example of the carrying out of the invention a gauge formed for the determination of stresses in exhaust stacks serving to discharge products of combustion directly from an aircraft engine to the atmosphere will be described.

Such stacks are subject to excessive vibration and are usually red hot at normal engine speeds. The exhaust stacks usually are made from stainless steel having a coefficient of expansion of about $13 \times 10^{-6}$ at 500° C. and a soft glass preferably containing cobalt having a coefficient of expansion of substantially the same as the steel was used to make the gauge.

In the form of the invention shown in Figures 1 to 4, the strain gauge is made by securing, for instance by soldering, a resistance element 10 comprising as shown a length of resistance wire of the requisite length to heavier wire 20 serving as leads for connection to electrical measuring instruments. The wire is then threaded into a length of glass tube 14 long enough to cover the resistance wire and by manipulation of the tube over a flame as shown in Figure 2 the glass tube between the leads is softened and the tube drawn out until the glass contacts the resistance wire.

The tube surrounding the soldered connections 18 between the resistance wire 10 and the lead 20 is preferably left in its original condition so as to enable air to circulate around the soldered leads and keep them cool enough to avoid melting the soldered joint.

In some cases it may be found desirable to protect the soldered connections 18 by sleeves of a material different from that used to form the sheath about the wire 10. There is shown in Figure 3 a modified form of the device in which a sleeve 16 of some suitable ceramic material is bonded to the glass sheath covering the wire 10.

After the glass is softened and formed about the wire, the glass encased wire is then bent into a grid by softening the glass at the location of the bends sufficiently to permit it to be bent, and the formed gauge is then fused to the test piece. This is done by melting the glass by torch 24 or some similar heating element while the glass sheath is held in contact with the surface member 12. Care should be taken to insure that the glass will completely cover the wire 10 as the glass is used to electrically insulate the same from the metal member.

The ends of the glass tube or the lengths of the tubes 16, whichever are used, may conveniently be secured to the surface of the part 12 by wire clips 22 held by the melted glass or welded to the surface of part 12.

Another method of insulatedly bonding the resistance element 10, again shown as length of resistance wire, to a part is illustrated in Figure 5 wherein the numeral 26 indicates a layer of powdered glass laid upon the surface of the part 12. The connection between the resistance wire 10 and the lead 20 of the strain gauge is furnished with a protecting means, such as the ceramic tubes 16, supported by clips 22, the ends of which are shown as inserted in the layer of powdered glass. The wire 10 of the strain gauge, formed in a grid, is laid in the powdered glass but spaced from the test part 12 and a flame is projected upon the powdered glass to melt the glass to cause the same to completely cover the resistance wire and the clips 22 while maintaining an insulating layer of glass between the wire and the metal member 12.

The resultant gauge is shown in Figure 6 after the glass has cooled and solidified. The resistance element of the gauge need not be a length of wire, for if desired a length of foil can be used. The foil either can be formed by bending a flat strip of suitable metal into a grid, or a grid can be cut or stamped from a flat sheet of the metal. The grid can also be formed by removing portions from a sheet of suitable metal and using the sheet itself as the resistance element.

Figure 7 depicts another method of attaching a strain gauge to the part to be tested wherein the numeral 10 again indicates the grid of resistance wire covered with a glass sheath 14. In this method a layer of frit or powdered glass 28 having the desired characteristics and containing oxide of cobalt, or nickel, or manganese dioxide, is deposited on the part 12 and melted by the flame from blow torch 24. When the layer of powdered glass has been melted upon the member 12, the glass-covered grid is placed upon the molten layer and the blow torch again applied, if necessary, to melt the glass covering the wire 10 to insure secure bonding of the glass-covered resistance wire to the layer of molten oxide-containing glass on the member 12.

Various other methods of making the gauges may be followed after having selected a suitable glass for the purpose in hand, for example:

The strain gauge may also be formed by weaving a sheath of glass fibers around a fine resistance wire and after laying the glass upon the test piece, melting the glass, for instance, with a blow torch, so that it secures the resistance wire throughout its length to the surface of the test piece. The grid used can also be coated by dipping the grid into molten material and then removing the same to allow the molten material to set and harden.

Another method of carrying out the invention is to lay the formed grid upon a layer of powdered glass placed on the test piece and cover it with a coating of the glass by heating the grid by an electric current of sufficient value to melt the powdered glass contacting the grid so that it will flow over and coat the same. The grid may then be removed and the layer of molten glass made uniform after which the glass-covered grid may be embedded in the molten glass on the test piece.

In each case the lead wires from the gauge to the electrical measuring instrument can be soldered to the grid or resistance element of the gauge, and the joint can be protected from heat by arranging a length of ceramic or porcelain tube such as the tubes 16 to cover the joint, the tube being maintained in position by a wire clip similar to the clips 22 previously described which may be retained in place by being embedded in the melted glass during the forming of the strain gauge as indicated in Figure 3.

Wires from which the clips are to be fashioned may be welded directly to the metal surface to be tested in the approximate position which will be occupied by the porcelain tube when in place, the tubes when placed over the lead wire joints being held in position by twisting the free ends of the wire round the tubes, after the gauge wire has been secured by the molten glass to the test piece.

It may be advantageous in some instances, in which it is difficult to readily obtain glass having a coefficient of expansion substantially equal to that of the metal of the test piece, to first apply to the test piece a layer of ground glass containing about ¼% of oxides of manganese dioxide, cobalt oxide, or nickel oxide, which material is commonly used in enameling metal. The oxide containing layer is then melted by the application of a blow torch and the strain gauge, previously given a glass coating as above described, is embedded in the molten layer, adhesion of the glass-covered gauge to the metal being satisfactorily effected by this procedure notwithstanding some discrepancy in the coefficient of expansion of the glass covering the strain gauge and that of the metal test place.

The procedure described may be used in securing strain gauges for the measurement of high temperatures to various metals or metal alloys such as Monel, nickel or aluminum, though in all cases care should be taken to secure the gauge to the bare metal.

In the case of aluminum, any coating of aluminum oxide should be removed from the location at which the strain gauge is to be positioned by dissolving the oxide coating by rubbing with phosphoric and chromic acid.

In order to assure the secure bonding of the strain gauge to the metal surface it may be advisable to first coat the metal at the area to which the gauge is to be secured with a metal wetting layer of frit containing a small percentage of substances acting to secure a wetting effect such as oxides of cobalt, or nickel, or manganese dioxide.

It will be noted that the grid of the strain gauge comprises relatively few turns compared to those of the usual paper-backed strain gauge, but it has been found in practice that such a construction is perfectly satisfactory, enabling accurate readings to be obtained of a character previously not possible to secure.

While ceramics such as glass soften progressively with increase in temperature and thus might permit a "creep" between the resistance wire and the medium with which it is mounted on the metal surface, the temperature of which is to be observed, it is possible to accurately allow for this effect by calibrating sample gauges secured by specific glass-like compositions to specific metals and checking the strain gauge readings, translated into temperatures, with temperature readings obtained by standard pyrometric instruments.

It is believed obvious that the strain gauge of this invention provides a valuable advance in the art of accurate determination of stresses in members at such high temperatures that the use of strain gauges of known forms is not possible. While the form of invention herein disclosed has proved satisfactory in use, various changes and modifications in the arrangement of the strain gauges and the methods of producing them may be made by those skilled in the art without departing from the scope of the invention as defined by the appended claims.

I claim:

1. A method of forming a high temperature strain gauge assembly for use on a metal part comprising, coating a length of resistance wire with a discontinuous substance melting at a temperature higher than that to which the metal part is to be raised, and having substantially the same coefficient of expansion as the metal of the part to be tested, placing a layer of discontinuous material, having substantially the same coefficient of expansion as the metal of which the part is made, upon a surface of said part and including in said layer at least ¼% by weight of an agent capable of dissolving the oxide layer on the metal part, bringing said layer of molten condition by the use of a high temperature flame and causing it to adhere firmly to the surface by reason of the action of the dissolving agent included in the ground material, encasing a length of the coated wire in said molten layer but out of contact with the surface of said metal part, allowing said layer of molten material to cool and bond said length of coated wire to said metal surface and also electrically insulate the wire attaching lead wires to said resistance wire, and providing the resistance wire and lead wire in the area of the joint between them, with a protecting shield of material resistant to high temperatures.

2. A method of forming a high temperature strain gauge assembly for use on a metal part comprising: coating a length of resistance wire with a vitreous substance melting at a temperature higher than that to which the metal part is to be heated, and having substantially the same coefficient of expansion as the metal of the part to be tested; placing a layer of ground vitreous material, having substantially the same coefficient of expansion as the metal of which the part is made, upon the surface of said part and including in said layer at least ¼% by weight of a metal-bearing wetting agent; bringing said layer to molten condition by the use of a high temperature flame and causing it to adhere firmly to the surface by reason of the action of the wetting agent included in the ground material; encasing a length of coated wire in said molten layer but out of contact with the surface of said metal part; and allowing said layer of molten vitreous material to cool and bond said length of coated wire to said metal surface and also electrically insulate the wire.

3. A strain gauge for the measurement of high temperatures comprising, accessories such as a length of fine resistance wire, means for securing said wire to the surface of a part, the temperature of which is to be observed, said means comprising a mass of discontinuous ceramic or glass-like material that is formed into a monolith structure together with said accessories, said material containing substantially ¼% of an agent capable of dissolving a metal oxide.

4. A method of forming a high temperature strain gauge assembly for use on a metal part and protecting the surface of the metal parts from high temperature oxidation comprising: coating a length of resistance wire with an insulating vitreous material, thereby protecting the surface of the wire from high temperature oxidation, said material melting at a temperature higher than that to which the metal part is to be heated and having substantially the same coefficient of expansion as the metal of which the part is made, upon the surface of said part and including in said layer a small proportion of materials acting to wet the surface of the metal part, bringing said layer to molten condition by use of high temperatures thereby protecting the surface of the metal parts from oxidation due to the high temperatures and causing the molten material to adhere firmly to the surface by reason of the action of the wetting agent included in the ground material, encasing a length of the coated resistance wire in said molten layer but out of contact with the surface of said part and out of contact with the air and allowing said layer of molten material to cool and bond said length of coated wire to said surface and also electrically insulate the wire, attaching lead wires to said protected resistance wire and providing means acting to protect the joint between the leads and the resistance wire from high temperature oxidation from the high temperatures of the metal part.

5. A method of forming a high temperature strain gauge assembly for use on a metal part, the surface of the meat parts protected from oxidation thermal effects, comprising, coating a length of resistance wire with a vitreous substance so as to prevent the wire from oxidizing said substance melting at a temperature higher than that to which the metal part is to be heated, and having substantially the same coefficient of expansion as the metal of the part to be tested, placing a layer of ground vitreous material, having substantially the same coefficient of expansion as the metal of which the part is made, upon the surface of said part and including in said layer at least ¼ percent by weight of a metal bearing wetting agent, bringing said layer to a molten condition by the use of a high temperature thereby forming a protecting layer for the metal surface to prevent oxidation and causing the molten mass to adhere firmly to the surface by reason of the action of the wetting agent included in the ground material, encasing a length of coated protected wire in said molten layer but out of contact with the surface of said metal part and allowing said layer of molten vitreous material to cool, the vitreous layer protecting the metal surface from oxidizing when heated, and bonding said length of coated wire to said metal surface and also electrically insulating the wire, attaching lead wires to said resistance wire, and providing means to shield the joint between the leads and the resistance wire from heat while permitting air to circulate around the said joint.

6. A method of forming a high temperature strain gauge assembly for use on a metal part comprising, coating a length of resistance wire with a fluid substance melting at a temperature higher than that to which the metal part is to be heated, and having substantially the same coefficient of expansion as the metal on the part to be tested, placing a layer of ground material having substantially the same coefficient of expansion as the metal of which the part is made, upon the surface of said part and incuding in said layer at least ¼% of a dissolving agent, bringing said layer to molten condition by the use of a high temperature flame and causing it to adhere firmly to the surface by reason of the action of the dissolving agent included in the ground material, encasing a length of coated wire in said molten layer but out of contact with the surface of said metal part, allowing said layer of fluid material to solidify and bond said length of coated wire to said metal surface and also electrically insulate the wire, attaching lead wires to said resistance wire, and providing means acting to shield the joint between the leads and the resistance wire from heat while permitting air to circulate around said joint.

WILLIAM C. GREGORY.

REFERENCES CITED

The following references are of record in the file of this patent:

UNITED STATES PATENTS

| Number | Name | Date |
| --- | --- | --- |
| 1,962,617 | Rosenberg | June 12, 1934 |
| 2,075,906 | Maude | Apr. 6, 1937 |
| 2,154,261 | Brandt | Apr. 11, 1939 |
| 2,280,257 | Pearson | Apr. 21, 1942 |
| 2,327,935 | Simmons | Aug. 24, 1943 |
| 2,344,648 | Simmons | Mar. 21, 1944 |
| 2,365,015 | Simmons | Dec. 12, 1944 |
| 2,367,211 | Greenfield | Jan. 16, 1945 |